US012568980B1

(12) United States Patent  
Lofland

(10) Patent No.: US 12,568,980 B1  
(45) Date of Patent: Mar. 10, 2026

(54) SYSTEM FOR PRESERVING PERISHABLE ITEMS

(71) Applicant: Dustin West Lofland, Santa Cruz, CA (US)

(72) Inventor: Dustin West Lofland, Santa Cruz, CA (US)

( * ) Notice: Subject to any disclaimer, the term of this patent is extended or adjusted under 35 U.S.C. 154(b) by 917 days.

(21) Appl. No.: 17/843,824

(22) Filed: Jun. 17, 2022

Related U.S. Application Data

(60) Provisional application No. 63/213,096, filed on Jun. 21, 2021.

(51) Int. Cl.
| | |
|---|---|
| *A23B 2/721* | (2025.01) |
| *B01D 39/20* | (2006.01) |
| *B01D 46/10* | (2006.01) |

(52) U.S. Cl.  
CPC .......... *A23B 2/721* (2025.01); *B01D 39/2027* (2013.01); *B01D 46/10* (2013.01); *A23V 2002/00* (2013.01)

(58) Field of Classification Search  
None  
See application file for complete search history.

(56) References Cited

U.S. PATENT DOCUMENTS

| | | | |
|---|---|---|---|
| 8,882,874 B1* | 11/2014 | Cross ................. | B01D 53/0407 |
| | | | 55/482 |
| 2010/0095924 A1* | 4/2010 | Harper .................. | B01D 46/10 |
| | | | 123/198 E |
| 2025/0270029 A1* | 8/2025 | Christensen ....... | B65D 85/8061 |

* cited by examiner

*Primary Examiner* — Brit E. Anbacht  
(74) *Attorney, Agent, or Firm* — Plager Schack LLP; Mark H. Plager; Kara K. Verryt

(57) ABSTRACT

A system for preserving perishable items in a sealable container may include a nitrous oxide filter engageable with the sealable container. The nitrous oxide filter may include an expansion/settling chamber, an adapter coupling operatively attached to an inlet of the expansion/settling chamber, a nozzle attached to an outlet of the expansion/settling chamber, and a filter media positioned with the expansion/settling chamber, wherein the filter adapter is configured to engage with an exit nozzle on an existing nitrous oxide cartridge system.

10 Claims, 4 Drawing Sheets

30

ATTACH UNIVERSAL NITROUS OXIDE FILTER TO THE OUTLET NOZZLE OF THE WHIPPED CREAM CANISTER

30A

CHARGE WHIPPED CREAM CANISTER WITH NITROUS OXIDE

30B

PLACE THE NOZZLE OF THE UNIVERSAL NITROUS OXIDE FILTER INSIDE A SEALABLE CONTAINER AND DISPENSE NITROUS OXIDE

30C

CLOSE SEALABLE CONTAINER LID TO TRAP NITROUS OXIDE INSIDE THE CONTAINER WITH PERISHABLE GOODS

30D

SYSTEM FOR PRESERVING PERISHABLE ITEMS

RELATED APPLICATION

This application claims priority to provisional patent application U.S. Ser. No. 63/213,096 filed on Jun. 21, 2021, the entire contents of which is herein incorporated by reference.

BACKGROUND

The embodiments described herein relate generally to the preservation of perishable items and, more particularly, to a system for storing and preserving perishable items.

Consumers create a large amount of waste due to perishable items going bad before being consumed. Nitrous oxide is an excellent gas for preserving perishable goods, but, other than whipped cream dispensers, there are not containers that include a cartridge system for applying nitrous oxide to the container. The existing cartridge system that is used with whipped cream containers contains unknown manufacturing waste particles and manufacturing oils that can contaminate the perishables. Moreover, when the existing nitrous oxide cartridges are pierced by the whipped cream canister, metal shards are created, which further contaminates a product within the container.

Therefore, what is needed is a nitrous oxide cartridge system to engage with an apply nitrous oxide into a container as a preservative, wherein the system includes a filter for preventing contamination of a product stored within the container.

SUMMARY

Some embodiments of the present disclosure include a system for preserving perishable items in a sealable container. The system may include a nitrous oxide filter engageable with the sealable container. The nitrous oxide filter may include an expansion/settling chamber, an adapter coupling operatively attached to an inlet of the expansion/settling chamber, a nozzle attached to an outlet of the expansion/settling chamber, and a filter media positioned with the expansion/settling chamber, wherein the filter adapter is configured to engage with an exit nozzle on an existing nitrous oxide cartridge system.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a preservation system for preserving perishable items and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-6, some embodiments of the present disclosure include a nitrous oxide filter 10 engageable with a container for storing perishable items, wherein the nitrous oxide filter 10 includes a filter and wherein the nitrous oxide filter 10 is used to spray the nitrous oxide from the adapter into the container for preservation purposes.

Figure 1:
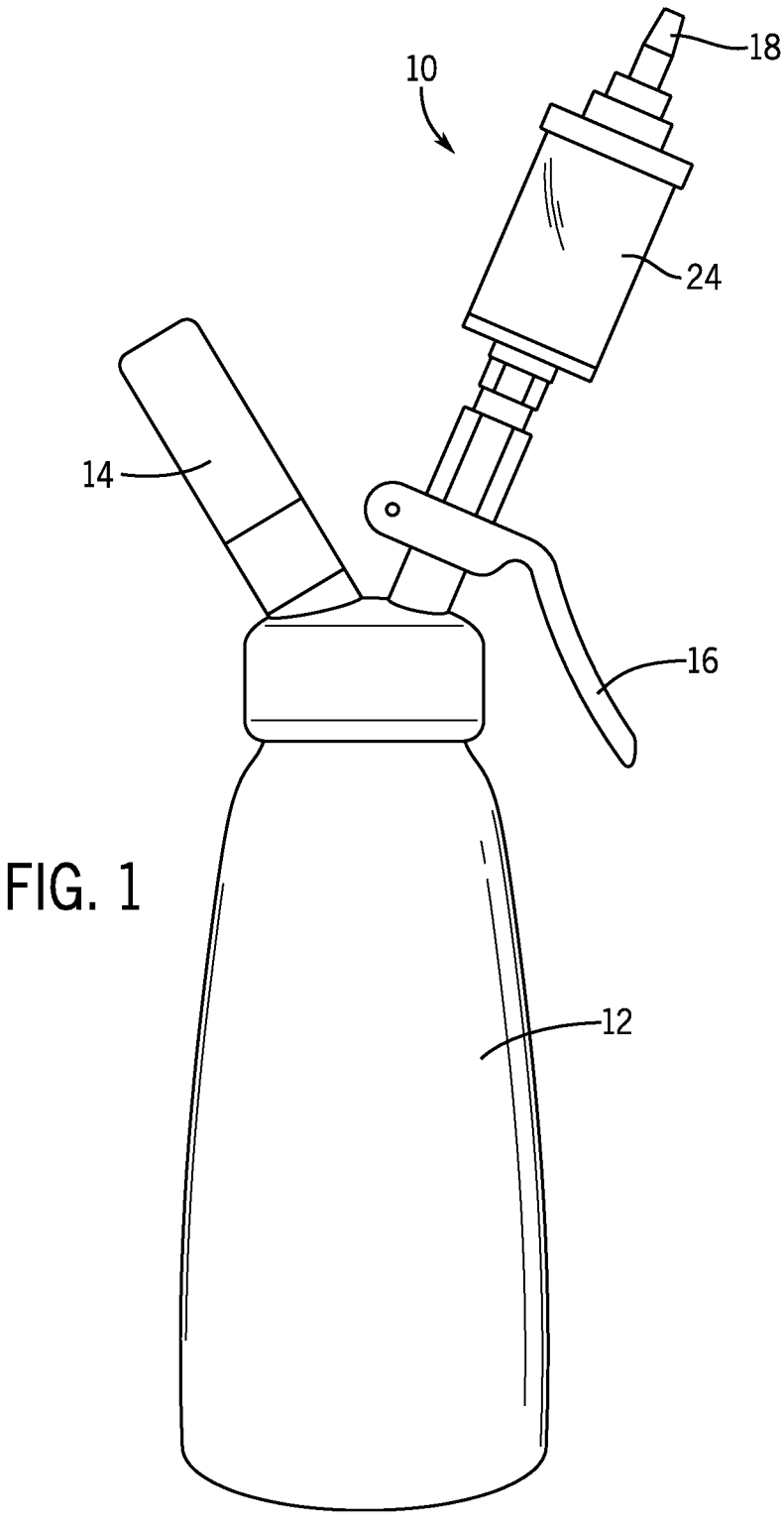
FIG. 1 is a side perspective view of one embodiment of the present disclosure, shown in use.
Figure 2:
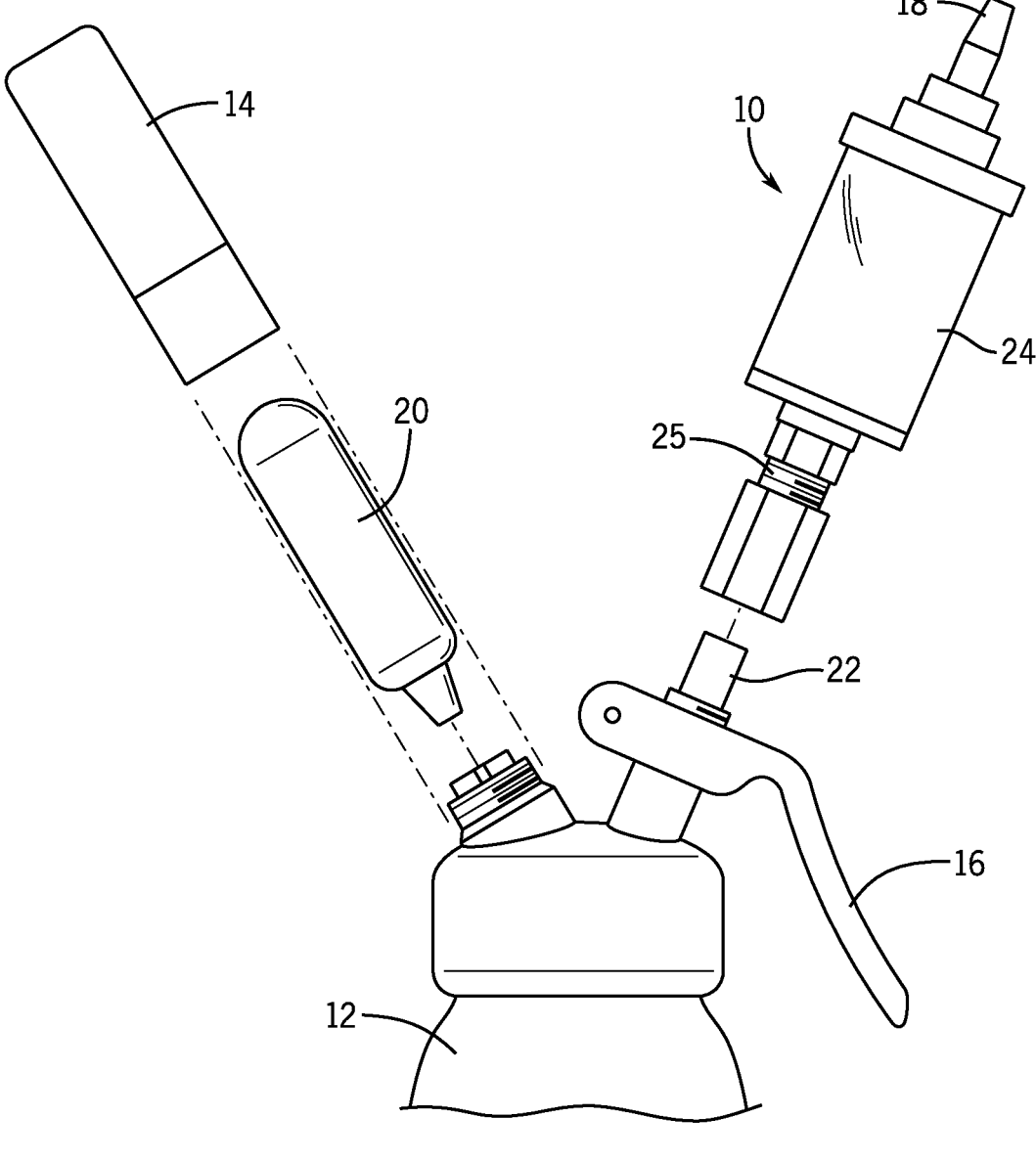
FIG. 2 is an exploded side view of one embodiment of the present disclosure, shown in use.
Figures 3, 4, 5:
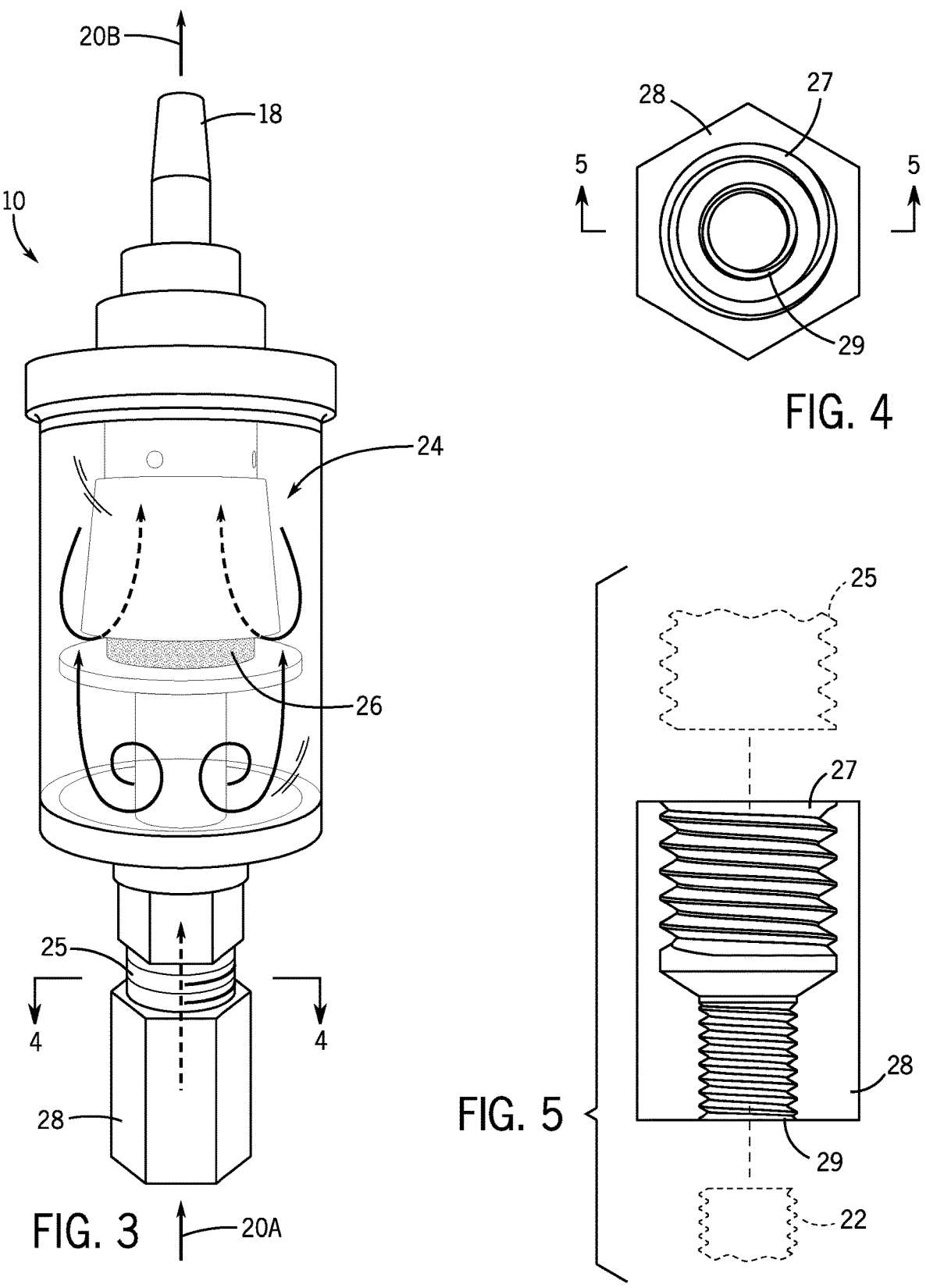
FIG. 3 is a detail perspective view of one embodiment of the present disclosure.
FIG. 4 is a section view of an embodiment of adapter coupling 28, taken along line 4-4 in FIG. 3.
FIG. 5 is a section view of an embodiment of adapter coupling 28, taken along line 5-5 in FIG. 4.

More specifically, and as shown in FIG. 3, the nitrous oxide filter 10 may comprise an expansion/settling chamber 24, an adapter coupling 28 operatively attached to an inlet 25 of the expansion/settling chamber 24, and a nozzle 18 attached to an outlet of the expansion/settling chamber 24. As shown in the Figures, the expansion/settling chamber 24 may be a substantially hollow chamber with a filter media 26 positioned therein, such that gas entering the expansion/settling chamber 24 must pass through the filter media 26 before exiting the expansion/settling chamber 24 through the nozzle 18. In some embodiments, the expansion/settling chamber 24 may be substantially cylindrical in shape, with the inlet 25 being at a first end thereof and the outlet being at a second end thereof.

In embodiments, the nitrous oxide filter 10 may function as a filter attachment for existing nitrous oxide cartridge systems. For example, a conventional whipped cream canister 12 may be charged using an existing nitrous oxide cartridge 20, such as a cartridge concealed by a cap 14. The nitrous oxide filter 10 may then be attached to the outlet nozzle 22 of the whipped cream canister 12. Specifically, the adapter coupling 28 may be operatively attached to the outlet nozzle 22 of the whipped cream canister 12 and to the inlet 25 of the expansion/settling chamber 24, causing the gas leaving the whipped cream canister 12 to be filtered by the nitrous oxide filter 10. The adapter coupling 28 may also be configured to be engaged with the outlet of any canister or container that can be charged with nitrous oxide.

In a particular embodiment and as shown in FIGS. 4 and 5, the adapter coupling 28 may be a substantially cylindrical threaded connector. In embodiments, the adapter coupling 28 may have first portion and a second portion, each of which has a threaded exterior. For example, in some embodiments, the first portion may have a larger diameter with threads that comprise National Pipe Threads (NPT thread) 27, and the second portion may have a smaller diameter with threads that comprise M7 threads 29. In use, the first portion may be designed to removably engaged with the inlet 25 of the expansion/settling chamber, and the second portion may be designed to removably engage with the nozzle 22 of the whipped cream canister 12.

Figure 6:
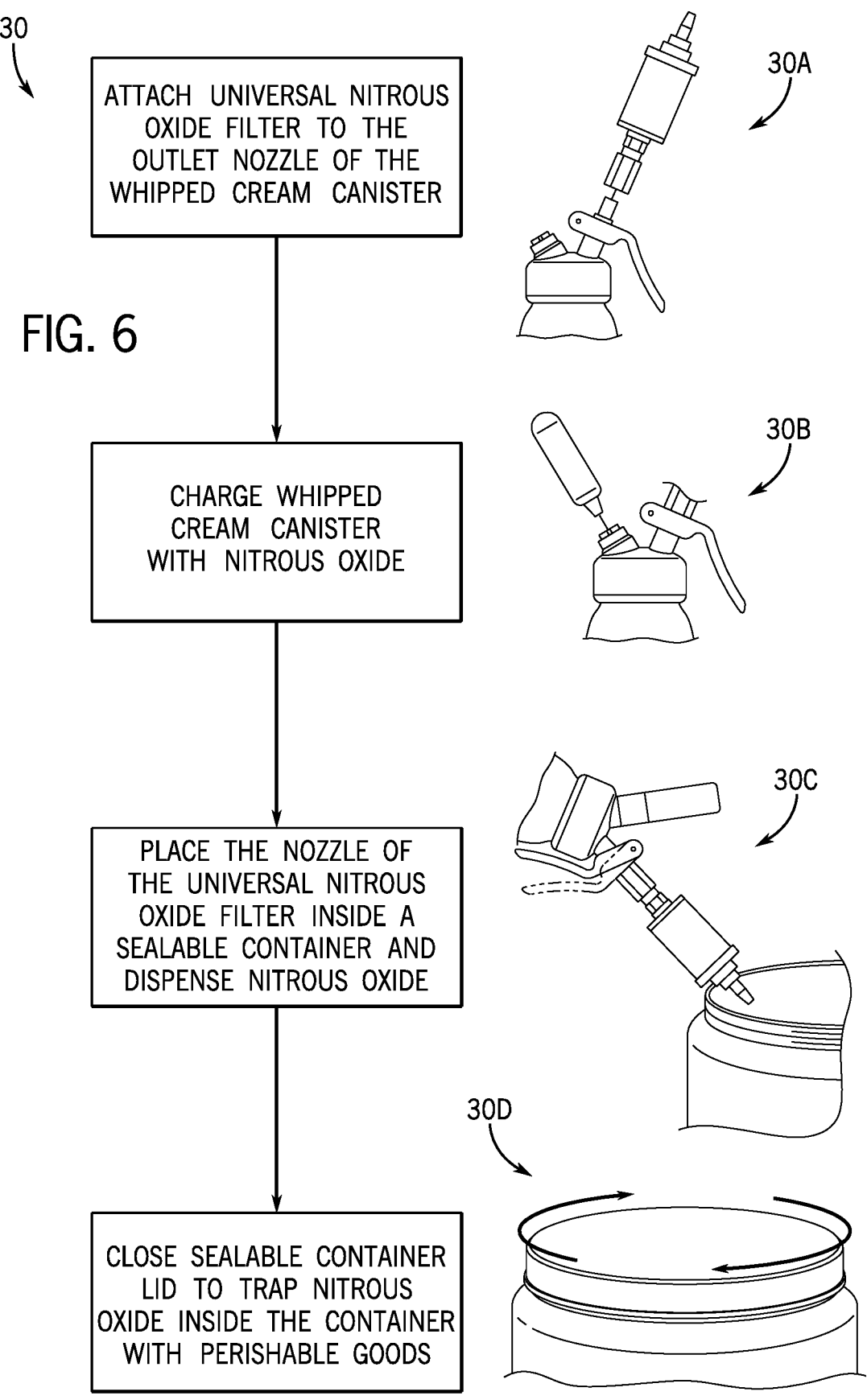
FIG. 6 is an illustrated flowchart explaining using of one embodiment of the present disclosure.

An embodiment of a method 30 of using the nitrous oxide filter 10 of the present disclosure for preserving a perishable good is described and shown in FIG. 6. As shown, a first step 30A may comprise attaching the nitrous oxide filter 10 to the outlet nozzle 22 on the canister 12. A second step 30B may comprise charging the canister 12 with a nitrous oxide cartridge 20 in a conventional way. A third step 30C may comprise placing the nozzle 18 into a sealable container containing perishable goods and dispensing the nitrous oxide from the canister 12 through the nitrous oxide filter 10 by depressing the dispenser trigger 16 on the canister 12. Finally, a fourth step 30D may comprise closing the sealable container to trap the nitrous oxide within the container with the perishable goods. Thus, using the nitrous oxide filter 10 of the present disclosure may allow a consumer to use clean nitrous oxide to help preserve perishable goods.

In embodiments, the components of the nitrous oxide filter 10 of the present disclosure may be made using any suitable and desirable materials. For example, the expansion/settling chamber 24 may be made of a plastic or other rigid material, and the filter media 26 may comprise filter media comprises a corrosion and chemical resistant, pressure rated, gas filter, such as a brass filter media.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A nitrous oxide filter engageable with a container for storing perishable items, the nitrous oxide filter comprising:
    an expansion/settling chamber;
    an adapter coupling operatively attached to an inlet of the expansion/settling chamber;
    a nozzle attached to an outlet of the expansion/settling chamber; and
    a filter media positioned with the expansion/settling chamber.

2. The nitrous oxide filter of claim 1, wherein the expansion/settling chamber is a substantially hollow chamber with the filter media positioned therein, such that a gas entering the expansion/settling chamber is forced to pass through the filter media before exiting the expansion/settling chamber through the nozzle.

3. The nitrous oxide filter of claim 1, wherein the expansion/settling chamber is substantially cylindrical in shape, with the inlet being at a first end thereof and the outlet being at a second end thereof.

4. The nitrous oxide filter of claim 1, wherein the filter media comprises a corrosion and chemical resistant, pressure rated, gas filter.

5. The nitrous oxide filter of claim 1, wherein the filter media comprises a brass filter media.

6. A system for preserving perishable items in a sealable container, the system comprising:
    a nitrous oxide filter engageable with the sealable container, the nitrous oxide filter comprising:
        an expansion/settling chamber;
        an adapter coupling operatively attached to an inlet of the expansion/settling chamber;
        a nozzle attached to an outlet of the expansion/settling chamber; and
        a filter media positioned with the expansion/settling chamber,
    wherein the filter adapter is configured to engage with an exit nozzle on an existing nitrous oxide cartridge system.

7. The system of claim 6, wherein the filter media comprises a corrosion and chemical resistant, pressure rated, gas filter.

8. The system of claim 6, wherein the filter media comprises a brass filer media.

9. The system of claim 6, wherein the expansion/settling chamber is a substantially hollow chamber with the filter media positioned therein, such that a gas entering the expansion/settling chamber is forced to pass through the filter media before exiting the expansion/settling chamber through the nozzle.

10. A method for preserving perishable items, the method comprising:
    placing the perishable items in a sealable container;
    attaching a nitrous oxide filter to an outlet nozzle on a whipped cream canister, the nitrous oxide filter comprising:
        an expansion/settling chamber;
        an adapter coupling operatively attached to an inlet of the expansion/settling chamber;
        a nozzle attached to an outlet of the expansion/settling chamber; and
        a filter media positioned with the expansion/settling chamber;
    charging the whipped cream canister with nitrous oxide from a nitrous oxide cartridge;
    placing the nozzle of the nitrous oxide filter into the sealable container;
    dispensing the nitrous oxide from the whipped cream canister through the nitrous oxide filter by depressing a dispenser trigger on the whipped cream canister; and
    closing the sealable container to trap the nitrous oxide within the container with the perishable items.

\* \* \* \* \*